Feb. 25, 1969  W. M. DOTTS, JR  3,429,809
AIR FLOTATION PROCESS FOR REMOVAL OF PARTICLES
OF SUSPENDED MATTER FROM WATER
Filed June 26, 1967
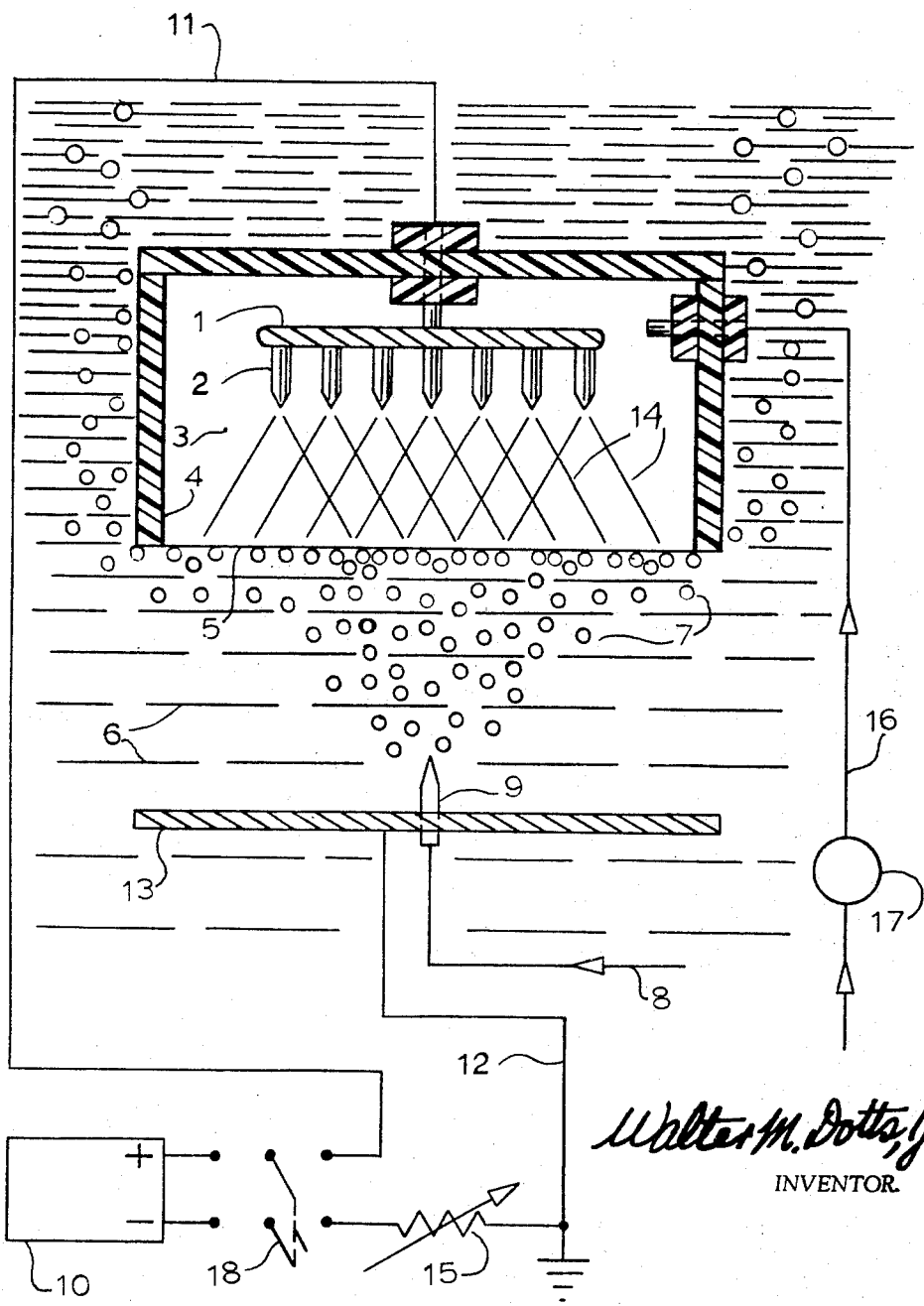
*Walter M. Dotts, Jr.*
INVENTOR.

United States Patent Office 3,429,809
Patented Feb. 25, 1969

3,429,809
AIR FLOTATION PROCESS FOR REMOVAL OF PARTICLES OF SUSPENDED MATTER FROM WATER
Walter M. Dotts, Jr., 2605 Monument Ave., Richmond, Va. 23220
Filed June 26, 1967, Ser. No. 648,678
U.S. Cl. 210—44   12 Claims
Int. Cl. C02b 1/20; B03c 5/00

ABSTRACT OF THE DISCLOSURE

The efficiency of air flotation for recovery or removal of particles of suspended matter from process or waste waters is improved by attaching electrical charges of preselected polarity to fine air bubbles used in the flotation process. One side of a thin, porous, membrane made of electrical non-conducting material, which separates a gaseous atmosphere from water, is bombarded by gas ions bearing electrical charges. Some of the electrical charges are transferred through the membrane and become attached to air bubbles impinging on the opposite side of the membrane. After acquiring electrical charges, the air bubbles exhibit improved ability to cause flocculation of oppositely charged colloids and other suspended particles, and otherwise increase the efficiency of the flotation process.

Background of the invention

The process of air flotation for recovery or removal of suspended particles of solids or water-immiscible liquids from process or waste waters is accomplished by employing very fine air bubbles which attach themselves to particles of suspended matter or which serve as nucleii for flocculation of small particles of suspended matter. The attachment of the fine air bubbles to the particles of suspended matter results in increased buoyancy of the suspended matter. Due to this increased buoyancy, the suspended matter floats to the surface where it may be recovered or removed by skimming according to conventional flotation practice.

Conventional air flotation processes are of two principal types. In dissolved air flotation, air is dissolved in water under superatmospheric pressure and the resulting pressurized solution of air in water is delivered to a zone of reduced pressure, usually near the bottom of a flotation tank, where most of the air is released from solution by the pressure reduction and effervesces in the form of extremely minute bubbles. In comminuted air flotation, compressed air is sparged through a fine pore fritted glass, porous ceramic, or porous metal dispersion device which introduces the air beneath the surface of water in the form of minute bubbles.

The rate at which suspended matter may be floated and the proportion of the total weight of suspended matter which can be recovered or removed from process or waste waters in one pass through the flotation tank—i.e., the efficiency of the flotation process—depends upon a number of design parameters. Two of the most important of these parameters are the proportionate volume of air which can be released within a given volume of water and the effectiveness of the fine air bubbles in attaching themselves to particles of suspended matter or in serving as nucleii of flocculation which attract and hold small suspended particles. This latter parameter, the effectiveness of the air bubbles in causing flocculation of suspended particles is a variable which can be controlled so as to increase the efficiency of the flotation process. However, in conventional flotation processes, no attempt has been made to control this important parameter except by efforts to achieve more thorough dispersal of bubbles throughout a flotation tank.

Heretofore, no direct improvement has been made to increase the flocculation efficiency of the air bubbles per se. This is odd in view of the increasing use of chemical flocculants, especially the use of polyelectrolytes, to achieve improved flocculation of suspended matter. Such polyelectrolytes are long-chain water-soluble polymers having high densities of charged sites along their lengths. These chains with charged sites bridge between suspended particles and cause agglomeration of several particles into a large floc, which is floated readily and thereafter recovered or removed from the water by conventional skimming means.

Summary of the invention

This invention relates to an improved air flocculation process comprising the improvement wherein electrical charges of preselected polarity are attached to fine air bubbles used in flotation, thereby increasing the efficiency of the recovery or removal of suspended matter from process or waste waters.

More particularly, this invention teaches how an electrical discharge of the corona wind type can be used to deliver a stream of charged gas molecules, or portions of such molecules, hereafter collectively termed "ions," to one side of a thin membrane made of electrically non-conducting material. If this membrane has pores, this bombardment by gas ions bearing electrical charges results in the transfer of some of these electrical charges across the thickness of the membrane where they become attached to fine air bubbles in a water medium as these bubbles impinge upon the opposite side of the membrane.

In the method of this invention, an effect similar to that achieved by the addition of water-soluble polyelectrolytes to the water is obtained by attaching electrical charges to the fine air bubbles employed in a conventional flotation practice. After acquisition of such electrical charges, these air bubbles become more effective to bridge between suspended particles or to attract such particles to themselves.

The reason for such improved flocculation ability of the charged air bubbles arises from the fact that most colloids and other suspended particles carry electrical charges themselves. In the majority of cases, the charges borne by the colloid micelles or other suspended particles are negative in polarity. In some cases, the charges on the suspended particles are positive in polarity.

In each situation, when provision is made for attaching electrical charges of opposite polarity to the fine air bubbles, the attraction between opposite charges causes the air bubbles more efficiently to attach themselves to the suspended matter or to attract the suspended matter to form flocs. Thus, for example, in a case where colloid micelles or other particles of suspended matter bear negative charges, the operator using the process of this invention preselects operating conditions under which positive charges are placed upon the fine air bubbles used in the flotation process. Alternatively, by simply throwing a switch, the operator can place negative charges on the air bubbles when the process or waste waters being treated contain suspended matter bearing positive charges.

It is, accordingly, the primary object of this invention to increase the efficiency of air flotation processes by providing for the use of fine air bubbles bearing electrical charges which have a greater flocculating power than electrically neutral bubbles.

It is also an object of this invention to provide a simple method for preselecting the polarity of the charges to be applied to such air bubbles.

A still further object of this invention is to provide a safe and fool-proof method for attaching electrical charges to fine air bubbles in an air flotation process.

Brief description of the drawing

The figure is a schematic diagram illustrating the method of this invention.

Corona wind discharge, especially when it originates from a pointed electrode, has been termed "silent discharge." It occurs when gas molecules in contact with the point of a discharge electrode, which is supplied with electrical power from a high voltage source, become ionized or charged with a polarity which is the same as that of the discharge electrode. These electrically charged gas ions bearing charges similar in polarity to the pointed electrode, are strongly repelled by that electrode. This strong repulsion results in a current of charged gas ions which flows away from the point of the discharge electrode. This current is referred to as a corona wind. When direct current electricity is supplied to the discharge electrode the resulting corona wind is called a direct current corona wind.

Referring now to the figure, in accordance with the teaching of this invention, a metal discharge electrode 1 comprising a plurality of needle points 2 is located in a gaseous atmosphere 3 in a confined space such as hood 4 fitted with an electrically non-conducting, porous, membrane 5 across it open bottom separating the gaseous atmosphere 3 from water 6 containing fine air bubbles 7. These air bubbles 7 may be formed as dissolved air effervesces from pressurized water delivered through pipe 8 and released from structure 9 which, in this case, would be a nozzles. Alternatively, the air bubbles 7 may be formed when compressed air delivered via pipe 8 is released from structure 9, which, in this case, would be a porous gas dispersion device. The needle points 2, of discharge electrode 1 are preferably perpendicular to the surface of the porous membrane 5 and are spaced from it a predetermined distance depending upon the voltage used on discharge electrode 1.

Upon connection of one pole of a high voltage direct current (D.C.) electrical power source 10 to the discharge electrode 1, via switch 18 and heavily insulated power cable 11, while the other pole is grounded to the water via switch 18, variable resistor 15, wire 12, and metal plate 13 surrounding the lower part of structure 9, the high voltage circuit is completed, thereby causing a strong corona wind 14 comprising electrically charged gas ions to flow away from needle points 2 and bombard the inside of porous membrane 5. When gas ions bearing electrical charges impinge upon the inside surface of membrane 5, these charges traverse the thickness of the membrane and become available on the opposite side which is in contact with water 6 containing fine air bubbles 7.

When the fine air bubbles 7 used in the flotation process impinge against the outside of the membrane 5, some of the available electrical charges which have traversed the membrane are transferred to these air bubbles. The air bubbles which have acquired charges are thereupon repelled by the similarly charged membrane and move away from it. Thereafter, according to conventional flotation practice, these charged air bubbles are dispersed throughout a flotation tank where they attach themselves to oppositely charged particles of suspended matter or serve as nucleii of flocculation which attarct oppositely charged suspended particles.

Immersed in the water and spaced from the membrane 5 which separates the gaseous atmosphere 3 from the water 6 may be a ground electrode such as metal plate 13 which is opposite in polarity to the discharge electrode 1 and which holds the surrounding water at ground potentials. If the said ground electrode 13 is nearly the same area as membrane 5 and is parallel to it and spaced a short distance from its outside surface in the water 6, more dependable and fool-proof operation is obtained, especially when process or waste waters of varying degrees of electrical conductivity are subjected to flotation treatment.

There is provided a variable circuit resistor 15 in series with the high voltage D.C. source 10 supplying power to the discharge electrode 1. When process or waste waters having low electrical conductivity are treated, this circuit resistor 15 can be adjusted so that it provides a relatively lower proportion of the total high voltage circuit resistance. In the opposite case, where water of relatively high conductivity is treated, an adjustment can be made so that resistor 15 supplies a relatively higher proportion of the total circuit resistance. Thus with the arrangement described, the total high voltage circuit resistance can be controlled at a preselected value, thereby determining the power level at which the process is operated for any given voltage on the pointed discharge electrode 1.

Conduit 16, connected to gas pressure regulator 17 controls the flow of gas to the inside of hood 4 to maintain a preselected pressure in gaseous atmosphere 3 within hood 4 approximately equal to the water pressure on the outside of membrane 5.

A double pole, double throw switch 18 is provided in the high voltage circuit from D.C. power source 10 and cable 11 to discharge electrode 1. By use of this switch, an operator can preselect the polarity of needle points 2 and, therefore, the polarity of the electrical charges to be transferred from the corona wind 14 to membrane 5 and across it to air bubbles 7 in water 6.

Description of the preferred embodiment

In the preferred embodiment of this invention the needle points 2 are preferably made of high temperature resistant metal like tungsten or stainless steel. Potting material (not shown) may enclose all of discharge electrode 1, excepting needle points 2, so that no spurious corona discharge will occur from the edges of electrode 1.

The potential on the needle points 2 generating the corona wind may vary widely from about 10,000 volts up to 100,000 volts or thereabouts. The higher the voltage employed the greater should be the spacing from the needle points 2 to the membrane 5. The intensity of the corona wind depends upon the voltage used and upon the number of points per unit area in the discharge electrode assembly.

In one example of the preferred embodiment, sixteen needle points were used on the discharge electrode and these were mounted on one inch centers in a square pattern and the points were spaced 4 inches away from the membrane 5. The potential used on the discharge electrode was 30,000 volts and the direct current flow was about 5 milliamperes in the high voltage circuit.

Especially when potentials of 30,000 volts or higher are employed on the discharge electrode, widespread breakdown of the molecules in gaseous atmosphere 3 occurs. Under such very high voltage operating conditions, collisions among charged ions, free electrons, and gas molecules become more violent and the number of free radicals formed increases. Free radicals are highly chemically reactive portions of molecules. Thus, if the gaseous atmosphere contains oxygen, free radicals formed from oxygen molecules will combine with other oxygen molecules to form ozone. Ozone is a strong oxidizing gas and its presence is not desired in the corona wind because it attacks the polymers of which most membranes are made. Therefore, in the preferred embodiment of this invention an atmosphere of some inert gas such as nitrogen, helium, or argon is maintained within hood 4.

Membrane 5 may be fastened across the bottom opening of hood 4 by any convenient means. For example, membrane 5 may be drawn over the opening and secured by a circumferential clamp (not shown in the drawing) around the walls of hood 4. The pressure of the inert gas within hood 4 is maintained approximately equal to or slightly above the water pressure acting on the outside of membrane 5.

The exact value of the gas pressure within hood 4 is not material to the process of this invention. However, in the preferred embodiment of the invention, it has been found most practical to balance the gas pressure within hood 4 acting on the inside of membrane 5 with the hydrostatic pressure due to the head of water acting on the outside of membrane 5. In this manner, the membrane 5 is not subjected to strain and can be used unsupported, if desired, over large areas. Then, as a precaution to prevent seepage of water into the interior of hood 4 in the event any pinholes appear in membrane 5, the gas pressure is increased slightly to produce a very slight excess pressure inside hood 4 as compared with the water pressure on the outside of membrane 5. This slight excess gas pressure within hood 4 is controlled through conduit 16 by conventional pressure regulating means 17 which is connected to a source of nitrogen gas under pressure.

The flotation tank, the influent water feed, the waste effluent discharge, as well as the surface skimming flights and associated apparatus and the product water effluent discharge are not shown in the drawing because they are conventional and form no part of the improvement of this invention.

Hood 4 can be located at any desirable point in the flotation apparatus, including the inlet riser for the feed water, with the chief proviso being that the fine gas bubbles used in the flotation process should be allowed to impinge upon the outside of membrane 5 shortly after they are formed and before they are dispersed throughout the flotation tank.

A plurality of set-ups like hood 4 fitted with membranes, discharge electrodes, high voltage connections and gas input conduits, may be provided at various locations in a large flotation tank at or near each station where a nozzle releases pressurized water containing dissolved air or, alternatively, where a gas dispersion device release compressed air in the form of minute bubbles.

It is an important feature of the process of this invention that membrane 5 be made of an electrically non-conductive material. The reason for this is that, for electrical charge transferral to occur across the thickness of the membrane, there must exist a potential gradient between the side receiving the corona wind discharge and the side in contact with the water.

If the membrane 5 were made of a porous metal sheet or of any other electrically conductive material, the potential gradient across its thickness would be virtually zero, especially when the electrical current flow is limited to a few milliamperes as is characteristic of a true corona wind discharge. Under such conditions, the electrical charges delivered to the inner surface of the membrane by the corona wind 14, would all flow virtually instantaneously to any location on the outside surface of the membrane 5 in contact with the water 6 where ions in the water would convey the charges away toward the metal plate 13, representing the grounded side of the high voltage circuit. Thus, the side of the membrane in contact with the water would be at the same potential as the water itself. Therefore, if an electrically conductive membrane were employed, there could not be any transferral of electrical charges to the fine gas bubbles impinging upon its outside surface.

By contrast, according to the teaching of the process of this invention, when membrane 5 is made of electrically non-conducting material, a large potential gradient is built up across its thickness as the corona wind brings electrical charges to its inner surface. The thinner the membrane, the larger this potential gradient will be for any given intensity of corona wind, gas pressure, and type of membrane. The thinner the membrane is and the larger the potential difference across it, the more efficient will be the charge transferral across its thickness to the fine gas bubbles impinging on its outside surface.

In order to build up the greatest possible potential gradient across the thickness of membrane 5, it is important that no charge shall leak off of the inside of membrane 5 where it meets the walls of hood 4 which are in contact with water 6. Therefore, it is preferred that the walls of hood 4 be made of non-porous, electrically non-conducting material. In a preferred embodiment, an acrylic plastic (Plexiglas) one-quarter inch thick was used to construct hood 4.

The size of a typical hood 4 and the number of complete units, such as that illustrated schematically in the figure, needed in any given flotation apparatus depends upon the surface area of the flotation tank. A rough rule of thumb is to use about one square foot of membrane surface exposed to the water for each twenty-five square feet of tank surface area.

Although membranes employed in this process must have at least some degree of porosity, and must be electrically non-conductive, it is not known exactly what other properties are involved in the transport of electrical charges from the corona wind across the thickness of a membrane to the fine air bubbles impinging upon the membrane's opposite surface.

Types of membrane material which have been tried and found effective for the practice of the method of this invention are as follows: (1) Cellophane. (2) Vinyl plastic porous dialysis membranes.

Typical examples of the latter category are Nalfilm D-30 and D-40 porous vinyl membranes made by the Nalco Chemical Company. Nalfilm D-30 has a void volume of 61-75% and pore diameters of 50 to 80 angstroms. Nalfilm D-40 as about 65% void volume and pore size of 60-100 angstroms. The Nalfilm D-30 membranes used were slightly over 0.004 inch thick, while the D-40 membranes were slightly below this figure in thickness. Both types of Nalfilm membrane used gave good results and it was not observed that the D-40 membranes with their larger pore size functioned any more efficiently than the D-30 type.

To illustrate the results obtainable by use of the process of this invention, tests were conducted in a model flotation tank using a corona-wind charge transfer set-up similar to that illustrated in the figure schematic.

A series of batch-type air flotation tests were carried out in a plastic tank of about 1.7 square feet surface area by two feet deep having about 25 gallons capacity. The input to be treated was river water containing a large amount of humis and peaty matter and other suspended solid matter obtained from a location near a municipal sewage outfall.

The membranes employed for charge transfer from the corona wind to air bubbles use in flotation were Nalfilm D-30 and D-40 porous vinyl plastic obtained from the Nalco Chemical Company. The average thickness of these membranes was 0.004 inch.

For the river water treated in these tests, the transfer of positive charges rather than negative charges to the air bubbles was found to be more effective in floating suspended matter. This confirmed published reports that suspended particles of solids of the types found in the sample water bear naturally occurring negative charges. Therefore, the discharge electrode was connected to the positive pole of a D.C. high voltage power source while the negative pole was grounded to a metal disc located parallel to the membrane and about 6 inches below it. The potential on the discharge electrodes was 30,000 volts in an atmosphere of nitrogen gas and the needle points were 4 inches above the inside surface of the membrane. Current flow was 5 ma.

Compressed air was discharged from a fritted glass gas dispersion device located about 5 inches below the Nalfilm membrane at the rate of about 0.2 standard cubic feet per minute at 20 p.s.i.g.

The membrane surface area in contact with the water at the hood location near the bottom of the tank measured about 0.2 square feet.

Control samples of the specimen river water were evaporated to dryness and found to contain an average of 2,963 milligrams per liter (mg./l.) of suspended solids.

Treatment was carried out for one hour with positive charges transferred to the air bubbles from the corona wind as these bubbles impinged upon the lower surface of the Nalfilm membrane. During this time the "float" was skimmed from the surface of the water in the tank. After one hour of treatment, samples were taken from various locations within the flotation tank and were evaporated to dryness. The average loading of suspended solids was found to be 84 mg./l., which is equivalent to 97 percent removal of suspended solids.

When the flotation conditions were duplicated with the same input river water taken from a common tub of specimen water, and no corona wind was employed, water samples taken after one hour of flotation treatment showed an average loading of 573 mg./l. suspended solids. This was equivalent to about 81% removal of suspended solids, whereas, by contrast, when the air bubbles were provided with electrical charges opposite in polarity to the charges naturally occurring on the particles of suspended matter, the efficiency of removal by air flotation was increased to over 97%, as mentioned above.

Improvde efficiency of flocculation of charged particles of suspended matter which are attracted to the charged air bubbles in thep rocess of this invention is not the only manner in which the electrical charges on the air bubbles increase the efficiency of a flotation process.

Observations made during the air flotation tests from which the average results are reported above, lead to the conclusion that the fine air bubbles used in flotation retain their original integrity longer when they are provided with electrical charges of the same polarity. That is, the repulsion between like charges on neighboring air bubbles reduces the frequency of occurrence of collisions between bubbles which result in coalescence of two or more bubbles to form a larger bubble. Since it is well known that a given volume of air is more efficient in flotation when it exists in the form of many very fine bubbles instead of in the form of fewer larger bubbles, the retardation of bubble coalescence by electrical charge repulsion between bubbles increases the efficiency of the flotation process.

Furthermore, the electrical repulsion between like charges causes a mass of bubbles carrying such charges to become dispersed more uniformly throughout a given volume in a flotation tank, thereby also increasing the efficiency of the flotation process for recovery or removal of suspended matter from process or waste waters.

It is impractical to make certain that all of the fine air bubbles employed in a flotation apparatus actually contact a membrane which is supplied with electrical charges according to the process of this invention.

Furthermore, observations of the behavior of the air bubbles near a charged membrane confirmed the view that some air bubbles which had picked up electrical charges by contact with the membrane thereafter contributed at least a portion of their charge upon contact to neutral bubbles which had not touched the membrane.

Therefore, it should be pointed out that the process of this invention remains useful and effective when only a portion of the air bubbles released in a flotation apparatus actually contact a membrane which has received electrical charges by bombardment with a direct current corona wind.

What is claimed is:
1. An air flotation process for removal of particles of suspended matter from water employing fine air bubbles to float said matter, wherein the improvement comprises:
   (a) generating a direct current corona wind comprising gas ions bearing electrical charges in a gaseous atmosphere which is separated from said water by a thin, porous, electrically non-conducting membrane;
   (b) bombarding the surface of said membrane which is in contact with said gaseous atmosphere with said corona wind; and
   (c) passing at least some of said air bubbles in contact with the opposite surface of said membrane, whereby some of said electrical charges become attached to at least some of said air bubbles.
2. The process of claim 1 wherein at least some of said particles of suspended matter carry electrical charges of one polarity and the polarity of said direct current corona wind is selected to be opposite.
3. The process of claim 1 wherein said membrane is a porous plastic membrane.
4. The process of claim 1 wherein said membrane is a dialysis membrane.
5. The process of claim 1 wherein said membrane is permeable to a gas.
6. The process of claim 1 wherein said membrane is cellophane.
7. A dissolved air flotation process for removal of particles of suspended matter from water employing fine air bubbles formed by releasing pressurized water containing dissolved air in a zone of reduced pressure, wherein the improvement comprises:
   (a) generating a direct current corona wind comprising gas ions bearing electrical charges in a gaseous atmosphere which is separated from said water by a thin, porous, electrically non-conducting membrane;
   (b) bombarding the surface of said membrane in contact with said gaseous atmosphere with said corona wind; and
   (c) releasing at least a portion of said pressurized water at a location spaced from the opposite surface of said membrane so that at least some of said air bubbles contact said membrane, whereby some of said electrical charges become attached to at least some of said air bubbles.
8. The process of claim 7 wherein at least some of said particles of suspended matter carry electrical charges of one polarity and the polarity of said direct current corona wind is selected to be opposite.
9. The process of claim 7 wherein said membrane is a porous plastic membrane.
10. The process of claim 7 wherein said membrane is a dialysis membrane.
11. The process of claim 7 wherein said membrane is permeable to a gas.
12. The process of claim 7 wherein said membrane is cellophane.

References Cited

UNITED STATES PATENTS

| | | | |
|---|---|---|---|
| 1,840,267 | 1/1932 | Tschudy | 209—166 |
| 3,074,870 | 1/1963 | Carswell et al. | 204—302 X |

MICHAEL E. ROGERS, *Primary Examiner.*

U.S. Cl X.R.

204—186